United States Patent
Kreissle

(10) Patent No.: US 6,363,616 B1
(45) Date of Patent: Apr. 2, 2002

(54) LINE RETAINING PLATE FOR TRIMMER HEAD OF STRING TRIMMER/MOWER APPARATUS

(75) Inventor: Stephen O. Kreissle, Grand Isle, VT (US)

(73) Assignee: Country Home Products, Inc., Vergennes, VT (US)

( * ) Notice: Subject to any disclaimer, the term of this patent is extended or adjusted under 35 U.S.C. 154(b) by 0 days.

(21) Appl. No.: 09/444,404

(22) Filed: Nov. 22, 1999

(51) Int. Cl.[7] .............................. B26B 9/00; A01D 34/00
(52) U.S. Cl. ........................... 30/347; 30/276; 56/12.7; 56/16.7
(58) Field of Search ................ 56/255, 205, 12.1, 56/12.7, 16.7; 30/276, 347

(56) References Cited

U.S. PATENT DOCUMENTS

| | | | |
|---|---|---|---|
| 4,068,376 A | | 1/1978 | Briar |
| 4,235,068 A | * | 11/1980 | Comer |
| 4,702,005 A | * | 10/1987 | Pittinger, Sr. et al. |
| 4,726,176 A | | 2/1988 | McGrew |
| 4,756,146 A | | 7/1988 | Rouse |
| 5,661,960 A | | 9/1997 | Smith et al. |
| 5,836,227 A | | 11/1998 | Dees, Jr. et al. |
| 5,862,655 A | | 1/1999 | Altamirano et al. |
| 6,052,974 A | * | 4/2000 | Harb |

* cited by examiner

Primary Examiner—H. Shackelford
(74) Attorney, Agent, or Firm—Mattingly, Stanger & Malur, P.C.

(57) ABSTRACT

A trimmer head assembly of a string trimmer mower apparatus has a stack of plates with a ground engaging member on one end of the stack. At the other end, the stack of plates is fastened to a rotating shaft that is driven in rotation by the motor or engine of the trimmer/mower. The plates of the stack have line retaining devices to which one or more lengths of cutting line are secured. Each plate is of a sufficient thickness to spread the respective line retaining devices axially or vertically apart from one another in suitable increments for providing cutting height adjustment selectively by securing a cutting line at the appropriate height. The line retaining devices enable the cutting line to be secured without tools and without disassembly of the trimmer head. Further, the line does not need to be clamped in place to ensure that it remains secured during high speed rotation of the trimmer head. The line retaining devices have two adjacent projections having channels formed around each projection that merge into a common channel at their one end. At the other end of the channels, opposite ends of a length of cutting line are inserted. The cutting line extends through the channels and out beyond the periphery of the plate. A mid portion of the line is tucked underneath a peripheral rim portion of the plate between the projections to secure the line in place.

16 Claims, 6 Drawing Sheets

LINE RETAINING PLATE FOR TRIMMER HEAD OF STRING TRIMMER/MOWER APPARATUS

FIELD OF THE INVENTION

The invention relates to a string trimmer/mower apparatus and more particularly to rotating trimmer head of a string trimmer/mower apparatus having at least one plate with a line retaining device, and further to a stack of such plates that provides a plurality of vertically spaced line retaining devices enabling cutting height adjustment by selectively securing a length of cutting line to one of the plates.

BACKGROUND OF THE INVENTION

String trimmers, for example, hand held trimmers, two wheeled trimmers and even four wheeled trimmers or mowers have been used for cutting vegetation with lines that are secured to a rotating head driven by an engine or motor. Typically, such string trimmers have been used for cutting the areas of vegetation that are inaccessible to mowers having steel blades. However, recently string trimmers have gained acceptance in the cutting of vegetation, e.g. grass, in a wide variety of situations.

For cutting vegetation with a string trimmer along an edge of a walkway or fence, for example, the vegetation is usually cut very close to the ground. As another example, however, string trimmers have been used as lawn mowers to cut grass at a desired length above the ground, for example two to four inches in order to provide a cut having a neat appearance. Still further, string trimmers have found wide use in the cutting of field-type growth that is cut rather infrequently and is left at a height of three to five inches or even more. Therefore, various designs have been incorporated in string trimmer heads to secure the string at a fixed height above the ground to select the height of the cut.

Also, many types of line retaining devices have been developed for use with string trimmers. With respect to retaining the cord on the trimmer head, it has been recognized that the cord or line experiences significant centrifugal force in operation of the trimmer. Further, as the cutting cord engages the vegetation, it is subjected to stress and vibration that will break the cord. While addressing these problems, other problems have resulted from designs attempting to provide a cord retaining arrangement which securely retains the cord on the trimmer head.

In several types of rotating trimmer heads, a length of flexible cutting line is secured to a disk using a clamping arrangement. For example, McGrew, U.S. Pat. No. 4,726,176, discloses a cutter for a rotary lawn mower in which radially extending passages between a central recess and the periphery of the disk are provided for accepting a length of cutting line. In this arrangement, the ends of the cutting line are fed into each of two passageways from the central portion of the disk. This leaves an intermediate portion remaining in the central recess of the disk that is clamped by the nut or bolt that holds the cutter on the drive shaft.

In another arrangement, shown in Dees, Jr. et al, U.S. Pat. No. 5,836,227, lengths of cutting line are held in channels of a lower plate which has an upper plate clamped down on the lower plate to secure the cutting lines in position within the channels. Altamirano et al, U.S. Pat. No. 5,862,655, shows yet another example, wherein a rotating cutting head has strings secured to the periphery of the disk using channels along the periphery of the trimmer head for the line. In this arrangement, the line is clamped by a plate bolted to the trimmer head to secure the lines in place.

In each of the above-described cutting heads of the prior art, it is necessary to clamp the line in place once the line has been fed into a channel or passageway. Clamping of the line is not desirable, however, since it requires an extra assembly step to be performed each time the line is replaced. Briar, U.S. Pat. No. 4,068,376, discloses an example of a cutter head that does not require a clamping arrangement. The rotating cutter head has an entry opening and an exit opening along the periphery of the disk through which a cutting line passes. One end of the cutting line is fed into the entry opening so that it passes through a connecting passageway and out the exit opening. The other end of the cutting line has an enlarged tab that prevents the line from passing through the entry opening and to ensure that the cutting line is secured by centrifugal force during the rotation of the cutting head. The cutter head of Briar, therefore, requires that the operator use specially designed cutting line that is precut into lengths wherein a tab is added to each line, which is undesirable.

Rouse, U.S. Pat. No. 4,756,146, also discloses a line retaining device that secures the cutting line without clamping the line to secure it. In this patent, a fixed line trimmer head is disclosed in which pairs of passages are located on the periphery of the head, each having entry and exit openings. Between each pair of the passages is a land. In use, the ends of a length of line are pushed through the entry openings of the passages on opposite sides of the land. When the ends of the line exit the passages, an intermediate portion of the line is engaged against the land thereby retaining the line. This enables the line to be replaced without unclamping the disk, however, the forming of the passageways requires assembling together two overlying disk-like plates that have matching recesses. Further, a ground engaging portion or ball is formed as an integral projection of the lower plate thereby preventing any cutting height adjustment from being made between the passageways that hold the line and the ground. Accordingly, although the line can be secured without the need for a clamping arrangement, the design of the trimmer head does not readily permit adjustments to be made to the cutting height.

Lack of adjustment in cutting height is a common problem. In each of the aforementioned patents, the trimmer head does not provide height adjustment. Rather, the distance between the ground engaging part of the trimmer head (if so equipped) and the cutting plane or line retaining disk in which the cutting lines emerge is not readably adjustable.

On the other hand, in Smith et al, U.S. Pat. No. 5,661,960, adjustment of the height between the body or platform of the line trimmer and the cutting lines is adjustable using spacer plates. However, there is no ground engaging structure for the trimmer head, so the distance between the cutting lines and the ground cannot be adjusted using the spacer arrangement. As a result, the two wheel line trimmer of Smith et al is typical of the prior art in which the operator adjusts the cutting height by balancing the position of the trimmer over the ground using the handles. This leads to uneven cutting unless a ground engaging member is used with the trimmer head.

The cutting height of prior art trimmers that use a ground engaging member can be adjusted by changing the distance between the ground engaging member and the cutting lines. Typically, however, this height cannot be adjusted without using tools or disassembling the trimmer head assembly and substituting various parts that provide a different spacing or distance between the plane in which the cutting line rotates and the bottom most part of the ground engaging member that moves across the ground during cutting. For example, trimmer/mowers are known that have a trimmer head in which the line is held by a plate that is mounted on a hub. The plate is vertically adjustable by loosening a set screw that locks it in position on the hub. The TROY-BILT trimmer/mower, for example, uses such an arrangement. Accordingly, adjustment of the cutting height of trimmer/mowers, in general, requires the use of tools or disassembly and assembly steps that deter the operator from making quick adjustments that otherwise might be preferred.

SUMMARY OF THE INVENTION

It is an object of the invention to overcome the above mentioned drawbacks of the prior art string trimmer designs. In particular, it is an object of the invention to provide a string trimmer apparatus that has a rotating head in which the cutting line can be replaced and securely retained without the need for making adjustments with tools, without the requirement for disassembly and assembly of the trimmer head, and in particular without the need to clamp the cutting line in place.

It is an object of the invention to provide a trimmer head having a plurality of axially or vertically spaced apart line retaining devices for enabling cutting height adjustment of the plane in which the string or line emerges from the trimmer head in a string trimmer apparatus without the need for making the height adjustment with tools or for disassembling the trimmer head to make the height adjustment.

It is a further object of the invention to provide a string trimmer head having at least two plates, each of which has at least one line retaining device, that are arranged in a stack. To adjust the cutting height, the cutting line is secured to one or the other of the plates using the respective line retaining device(s).

According to a preferred embodiment of the invention, each plate of a stack of line retaining plates has a predetermined thickness so that the respective line retaining devices are spaced apart from one another in suitable vertical increments for cutting height adjustment. In this regard, spacers can be added to the stack of plates to provide additional spacing or the stack can be formed of a plurality of plates that are substantially the same. Further, the cutting line can be secured to one or more line retaining devices of only one of the plates at a time, or to more than one of the plates at a time, as the situation requires.

It is yet a further object of the invention to provide a plate for a string trimmer head having at least one cutting element retaining device to which a cutting element, such as a length of line or string, is secured without the need for tools or for a clamping arrangement to secure the line in place. Depending on the circumstances, one plate can be used for providing the function of securing a line to the trimmer head. Optionally, the line retaining plate can be used in conjunction with other plates or a ground engaging member, in the assembly of a trimmer head when cutting height adjustment is not required.

It is still a further object of the invention to provide a plate for a string trimmer head having a cutting element retaining device, in which the plate is able to be stacked with like or different plates to form a stack of plates that substantially forms the trimmer head, optionally with a ground engaging member. Spacer plates can be incorporated in the stack to space the respective cutting element retaining devices apart from one another or the thickness of the plates can provide an inherent spacing function. The height of cutting can be adjusted by selectively using an appropriate plate for retaining the cutting element at the desired height or, alternatively, a cutting element can be secured to each plate for providing cutting at plural heights at the same time.

DETAILED DESCRIPTION OF THE PREFERRED EMBODIMENTS

Figure 1:
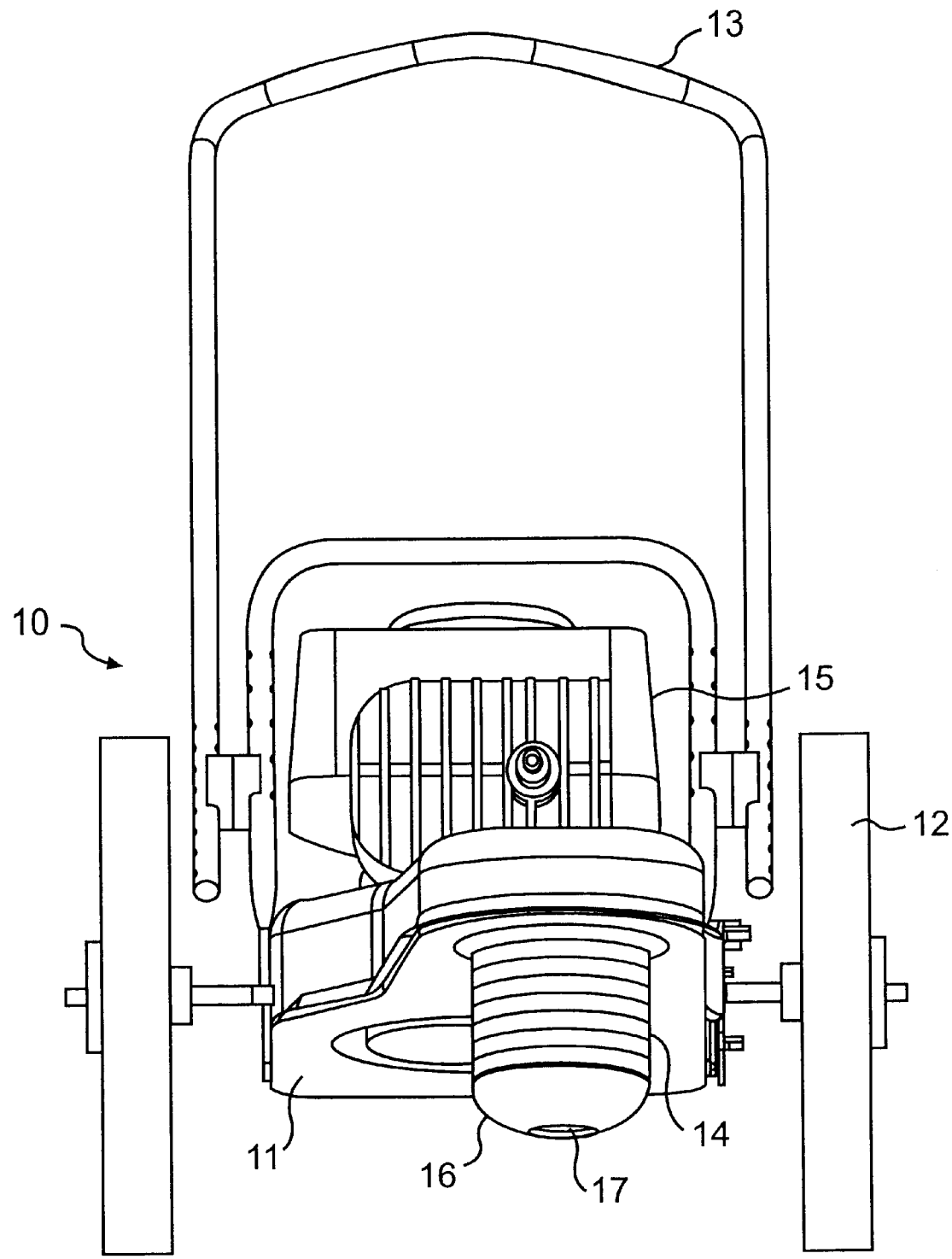
FIG. 1 is a perspective view of a string trimmer/mower apparatus having a rotating trimmer head constructed according to the present invention.

FIG. 1 is a diagram of a string trimmer/mower apparatus 10 to which the present invention is applicable. The string trimmer/mower is of the type having two wheels 12 and a trimmer or cutting head 14 that is driven in rotation in a conventional manner by an engine 15 mounted on a frame 11. Since the trimmer/mower has only two wheels, the user guides the cutting head over the ground using the handle 13. The height of the cutting plane, which is the plane where the cutting line or strings rotate, is defined with respect to the distance between the ground engaging support member 16 that is mounted on the base of the trimmer head and the point at which the strings (not shown in FIG. 1) emerge from the trimmer head 14. According to the present invention, the height of the cutting plane is readily adjustable by the user.

Although the trimmer head is shown to be of the type adapted to be mounted on a two-wheeled trimmer/mower, the trimmer head is also suitable for use with a hand held trimmer having no wheels or a mower type of trimmer that has three or four wheels in which cutting lines are used in place of conventional steel blades.

Figure 2:
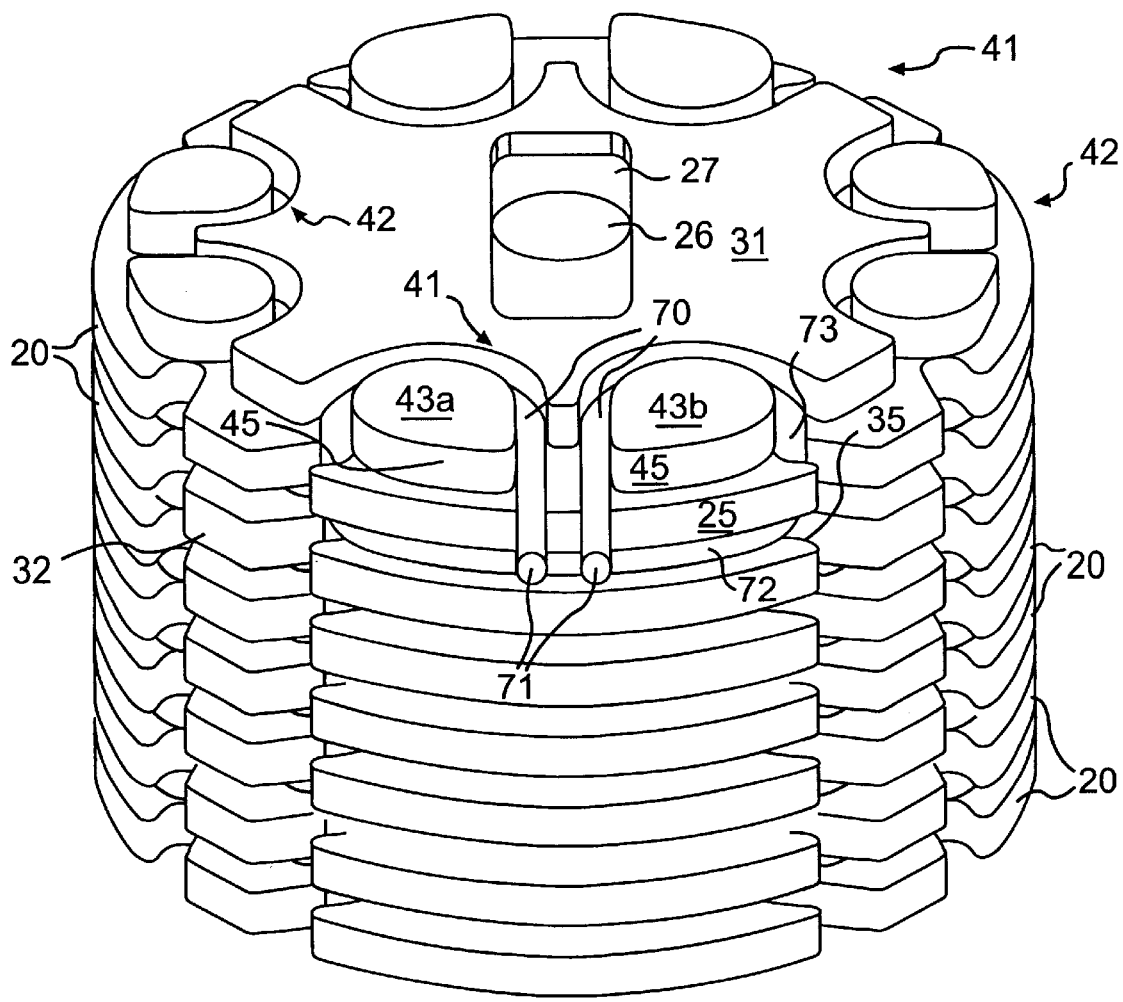
FIG. 2 is a perspective view of a stack of plates forming a body portion of the string trimmer head constructed according to the present invention.

As shown in FIGS. 1 and 2, the trimmer head has a body portion formed of a plurality of line retaining plates 20 fastened together in a stack. The trimmer head is mounted to be driven in rotation at one end of the trimmer/mower housing.

In a preferred embodiment, each plate 20 is substantially the same and has cutting element retaining devices 41, 42 that are used to secure a cutting element to the plate. Preferably, the cutting element is a predetermined length of cutting line 70 that is secured to the periphery of the cutting head 14. The preferred embodiment of the trimmer head which uses line as the cutting element(s) will be explained in greater detail with reference to FIGS. 3–7.

Since each of the plates can perform the function of retaining at least one cutting line in a plane substantially coincident with the passageways in which the line is retained, the height of the cutting plane can be adjusted by moving the line(s) from one of the plates 20 to another depending on the height of the cut desired. As explained in detail hereinafter, the lines 70 can be secured in place in any one of the plates without the need for tools to make adjustments and without the need to disassemble the stack. Optionally, cutting lines 70 can be secured to more than one plate 20 of a stack in order to cut at a plurality of heights at the same time. Accordingly, adjusting the height of the cutting plane or cutting at plural heights at one time, as well as replacing worn or broken lines in the cutting head 14 can be performed quickly and efficiently.

A preferred embodiment of a plate 20 is shown in FIGS. 3–7. Plate 20 has a body 21 with a top face 22 and a bottom side 23. An outermost peripheral rim 24 extends upward from the bottom face and is about one half the thickness of the body 21. The top and bottom faces of the plate are essentially flat, thereby enabling stacking of a desirable number of like or compatible plates in a plate stack. A stack of substantially similar plates 20 that forms the body of the trimmer head is shown in FIG. 2.

Each plate 20 has a center mounting hole 26 around which is formed a rectangular recess 27 in the top face 22. The rectangular recess on the top side of plate 20 receives downwardly extending flanges 28 formed in the bottom face of an upper adjacent plate. Engagement of flanges 28 of an upper plate in the rectangular recess 27 of an adjacent, lower plate interlocks each plate in the stack to prevent relative rotation between the plates when the stack is driven in rotation during cutting. When other types of compatible plates that are intended to perform other functions or just to provide spacing are incorporated in the stack, then each of these plates also includes the mounting hole 26, rectangular recess 27 and flanges 28.

Figure 8:
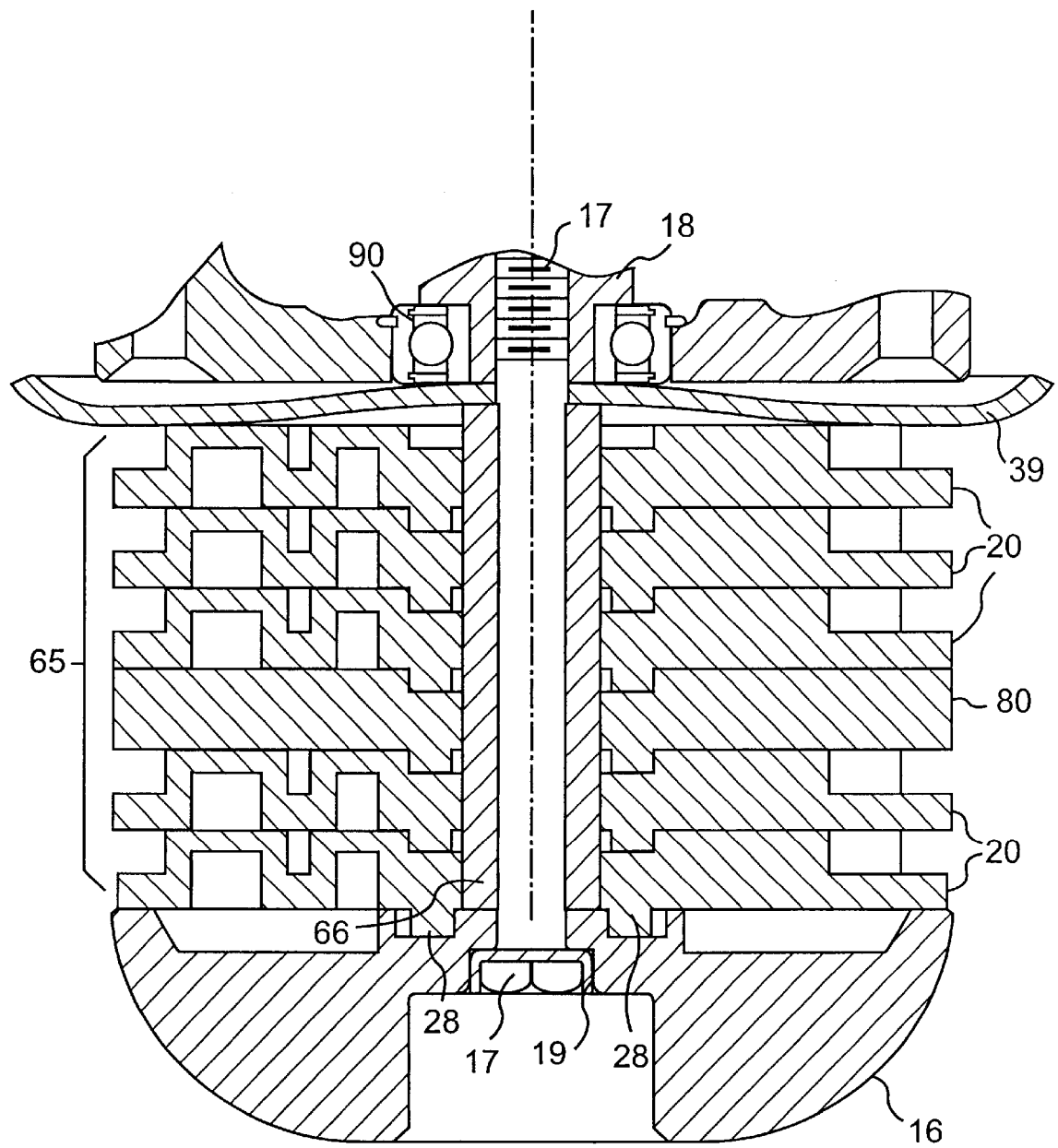
FIG. 8 is a sectional view of a string trimmer head assembly according to the present invention.

Each plate 20 preferably has a thickness of about 0.5 inches, and in the embodiment of a stack of plates shown in FIG. 2, seven plates are shown thereby providing a range of vertical or axial spacing for cutting height adjustment of approximately 3 inches, in one-half inch increments. The overall thickness of plate 20 can be different from that of the preferred embodiment. Spacer plates (not shown in FIG. 2) can be used in between one or more plates in order to increase the spacing increment, if desired. Further, the ground engaging part 16, as shown in FIGS. 1 and 8, which has a vertical dimension of 1–2 inches is optional. If incorporated in the stack, the ground engaging part 16 should be factored into calculating the actual cutting height that is provided by the cutting head 14. Although FIG. 2 shows a preferred embodiment of a stack of plates 20 that forms the body portion of the trimmer head 14, additional plates 20 or other compatible plates 80, as shown in FIG. 8, can be added (or removed) to respectively increase or decrease the range of cutting heights and functions performed by the trimmer head, as desired.

FIGS. 4–7 show the details of a preferred embodiment of plate 20. In a top view of the plate shown in FIG. 4, four line retaining devices 41, 42 are shown. The plate is generally circular and each line retaining device occupies a quadrant of the plate, however plate 20 could have as few as one or two line retaining devices and more than four, if desired. General symmetry is preferred because the plate is driven in rotation at a relatively high rpm.

The preferred embodiment shows that the line retaining devices 41, 42 are of two types. Each of the devices could be of the same type or all different from one another. Nonetheless, the difference between the line retaining devices 41 and 42 is merely dimensional. Line retaining device 41 is designed to accommodate a larger diameter of cutting line than that of device 42. Since each is substantially the same, however, the following description pertains to both types.

Each line retaining device 41, 42 includes two projections 43a, 43b having a top face 44 that is coplanar with the top face 22 of the plate body 21. Single channels 46a, 46b are formed behind respective projections 43a, 43b and each has a corresponding guide wall 47a, 47b. At one end of single channels 46a, 46b, the respective guide walls 47a, 47b merge into a common channel 48 extending between projections 43a, 43b. That is, a channel divider 49 is positioned between single channels 46a, 46b at the ends of guide walls 47a, 47b adjacent common channel 48. Common channel 48 opens toward the periphery of the plate at a first rim portion 50 of peripheral rim 24. At the other ends of single channels 46a, 46b are the entryways for the cutting line ends, which are adjacent respective second rim portions 51 of peripheral rim 24. Indentations 52 are preferably formed in the vicinity of second rim portions 51, as shown.

Figure 3:
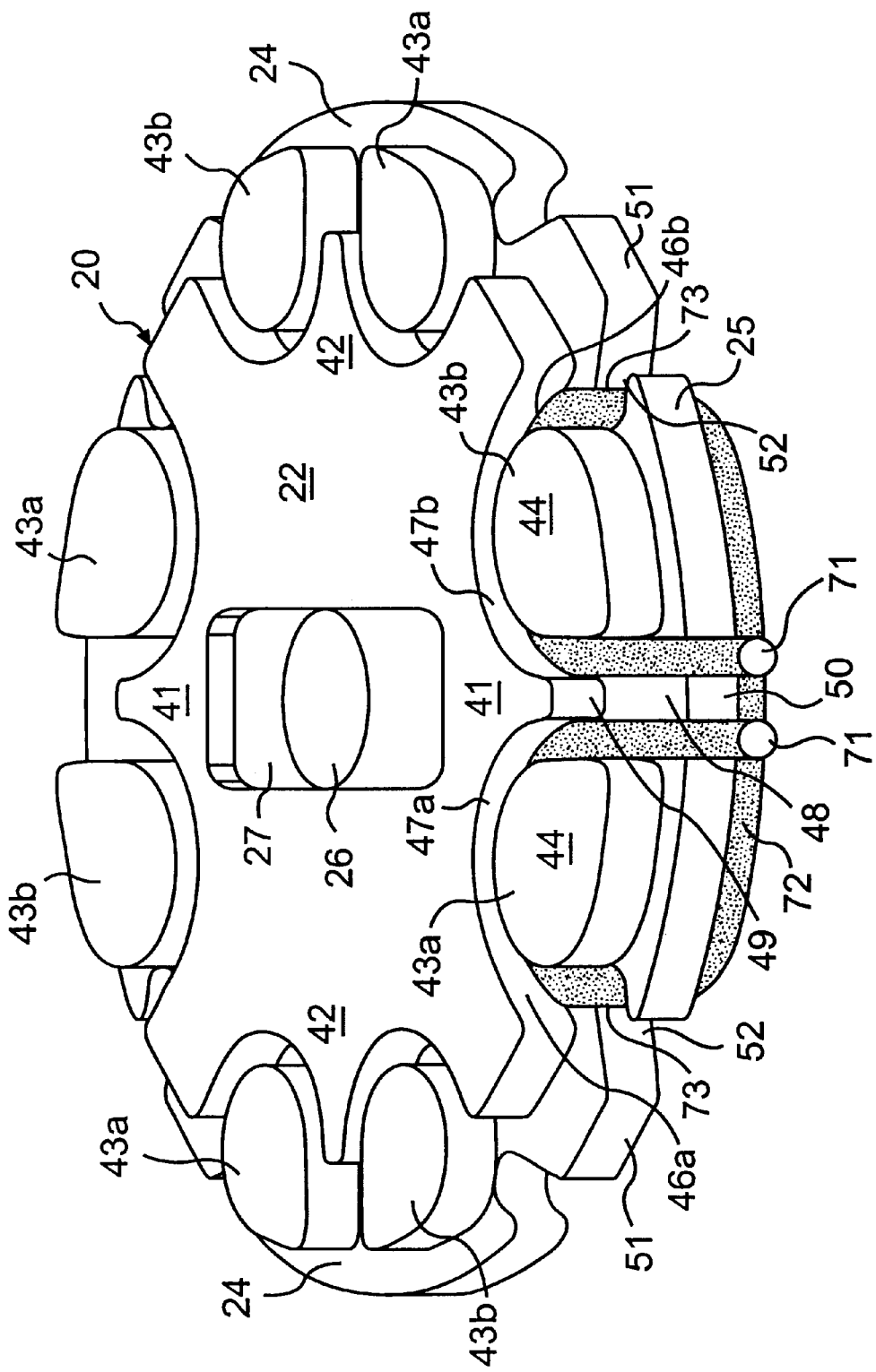
FIG. 3 is a perspective view of a line retaining plate constructed according to a preferred embodiment of the invention.
Figure 4:
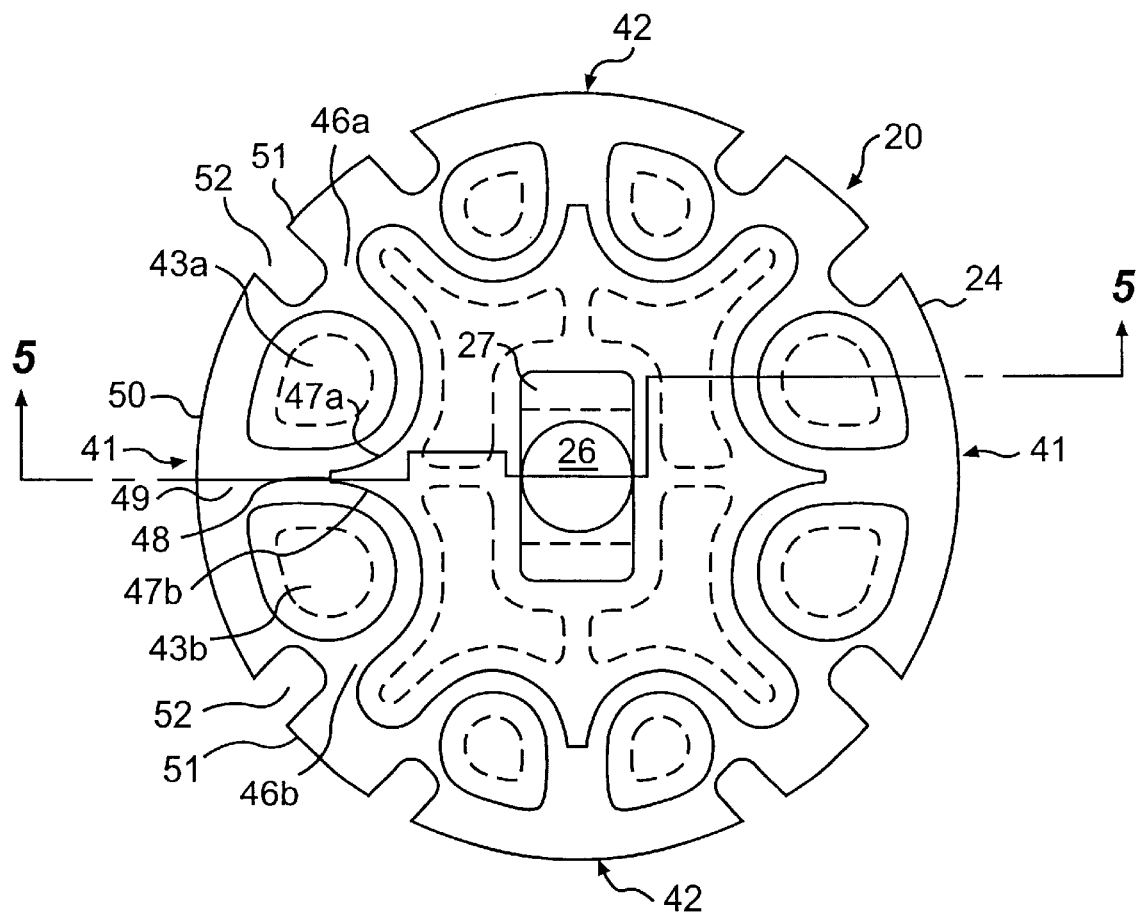
FIG. 4 is a top view of the line retaining plate shown in FIG. 3.

With reference to FIG. 3, a length of cutting line is secured to a line retaining device 41 in the following manner (which is the same for line retaining devices 42). First, opposite ends 71 of the cutting line 70 are inserted into the entryways of single channels 46a, 46b that are adjacent the second rim portions 51, respectively. Then, the ends 71 of the cutting line are guided through the single channels 46a, 46b and are guided by guide walls 47a, 47b. Further insertion of the ends through the single channels 46a, 46b results in the ends 71 emerging out from common channel 48 at the first rim portion 50, as shown. Of course, a longer length of cutting line would typically extend farther beyond the periphery than is shown in FIGS. 2 and 3.

To secure the length of cutting line that has been inserted into the channels 46a, 46b around the projections 43a, 43b, a mid portion 72 of the cutting line is passed under the first rim portion 50. In particular, axially extending sections 73 of line 70 are slipped into indentations 52 in order to guide line 70 under first rim portion 51 to be secured as shown in FIGS. 2 and 3.

As shown in FIG. 2, although plates 20 are stacked vertically on top of one another, each line retaining device 41, 42 is accessible for securing a length of cutting line to be retained at the desired height. In particular, the mid portion 72 of the cutting line that is shown secured in line retaining device 41 of a top plate 31 can pass under the first rim portion 50 thereof without interference by the next lower plate 32 since the peripheral rim 24 extends radially outwardly a greater distance than the front face 45 of the projections 43a, 43b. Further, the mid portion 72 of the cutting line is seated within a recess 35 formed between peripheral rims 24 at adjacent plates 31 and 32 so that exposure of the cutting line is minimized, which extends the life of the cutting line. Similarly, indentations 52, which are recessed with respect to front face 25 of the peripheral rim 24 also protect the cutting line from being exposed.

Although FIG. 2 shows a stack of plates 20 that is sufficient in number to constitute the body of trimmer head 14, the assembled trimmer head further includes a back-up plate 39 that is at the very top of the stack, above the top plate and a ground engaging member 16 at the bottom of the stack.

FIG. 8 is a cross-sectional view of an assembled trimmer head 14, having a stack 65 of plates with a back-up plate 39 at the top of the stack and a ground engaging member 16 at the bottom of the stack. Ground engaging member 16 has a rectangular recess 13 that is similar in shape to rectangular recess 27 of plate 20, which receives the flanges 28 of the bottom most plate in stack 65. Each upper plate in the stack 65 serves the function of closing off the upwardly facing open portions of the channels of the next lower plate. Back-up plate 39 similarly serves the function of closing off the upwardly facing open portions of the channels of the top most plate in the stack so that cutting line can be retained in the line retaining devices as described.

The stack 65 is fastened together using a threaded fastener, such as cap screw 17 that passes through a sleeve 66 that is fit within aligned center holes 26 of the plates. Cap screw 17 has a square or hexagonal head seated within recess 19 of the ground engaging member 16 and is threaded into a tapped hole in shaft 18. Shaft 18 is driven in rotation through a pulley, for example, by the trimmer/mower's engine or motor and is supported in rotation by ball bearing 90. Tightening of screw 17 draws back-up plate 39 into engagement with the inner ring of bearing 90 and/or shaft 18 to ensure rotation of trimmer head 14 with shaft 18.

As shown in FIG. 8, the body of the trimmer head 14 can optionally include one or more plates 80 that are different from plates 20 in that each does not necessarily have line retaining devices 41, 42. Plates 80 are compatible plates, however, in that each is able to inter-work with plates 20. In this regard, plate 80 has a mounting hole 26, rectangular recess 27 and flanges 28. Preferably, plate 80 has a diameter that extends to at least the front face 45 of the projections 43a, 43b of plate 20 so as to serve the function of closing off the upwardly facing open portions of the channels of the next lower plate.

As shown in FIG. 8, plates 80 are included for increasing the versatility of the trimmer head. For example, one or more plates 80 could provide an independent cutting function or an additional increment of spacing. For providing a separate cutting function, plates 80 could be equipped with a pivotally mounted metal or plastic blade (not shown) that is mounted on the periphery of the plate to swing out under centrifugal force during rotation of the head for cutting. Alternatively, one or more plates 80 could be included in the stack 65 to perform a spacer function between plates 20. Also, it is advantageous that the plates of stack 65 provide sufficient mass for the body of the trimmer head, thereby generating inertia during rotation of the head. By increasing the inertia of the trimmer head, the rotational speed of the head is not reduced as quickly during cutting, which is especially noticeable when cutting through thick vegetation. Even though disassembly of the trimmer head is required to exchange, add or remove plates to the stack 65, a versatile trimmer head is provided by including a variety of compatible plates 80 that can be selectively incorporated with plates 20.

Figure 5:
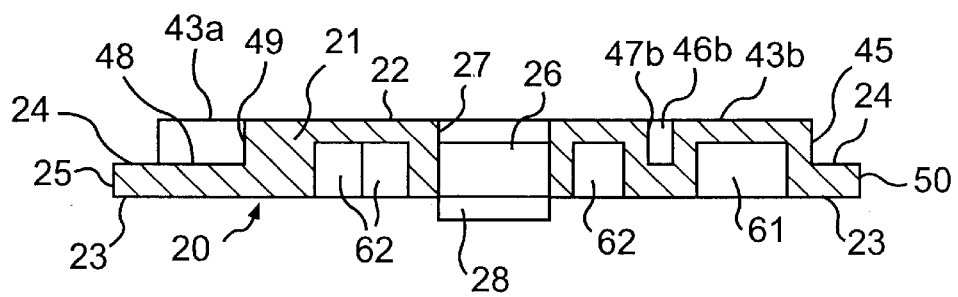
FIG. 5 is a sectional view taken along line 5-5 of the plate shown in FIG. 4.
Figure 6:
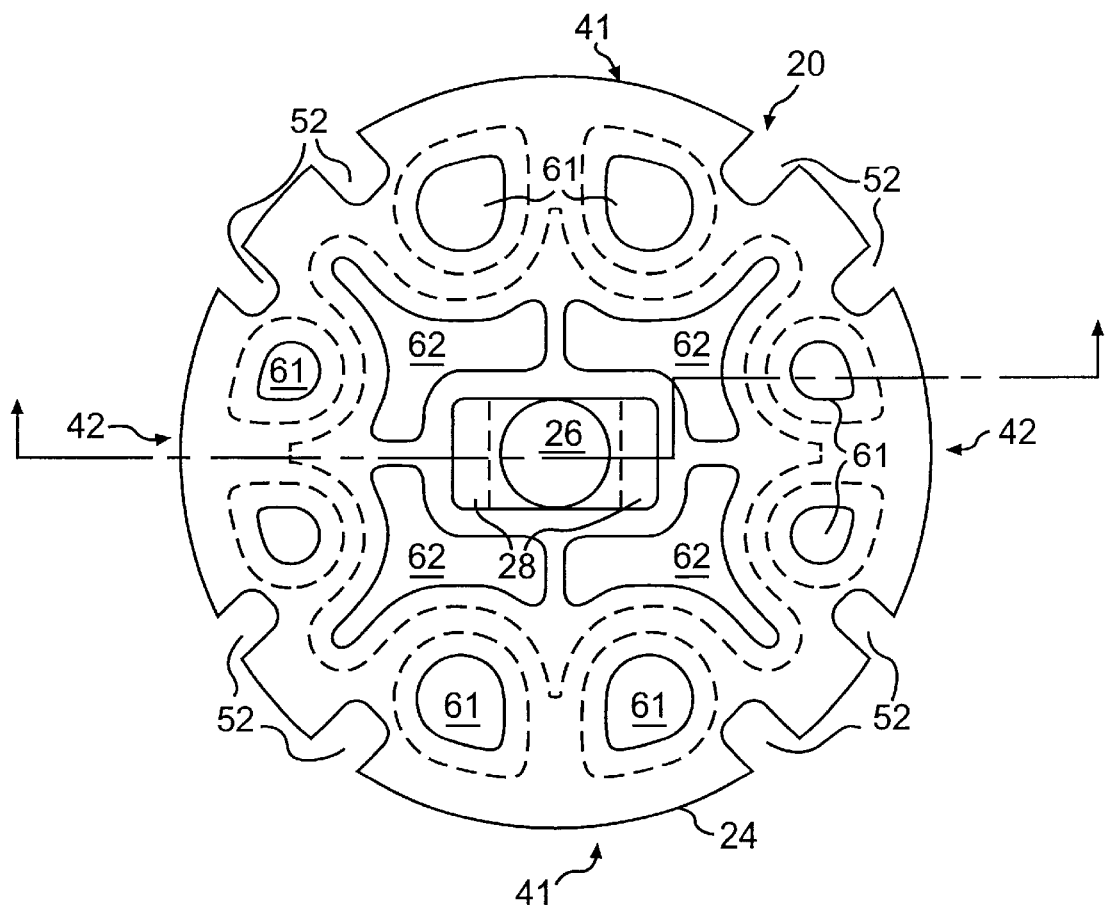
FIG. 6 is a bottom view of the plate shown in FIG. 4.
Figure 7:
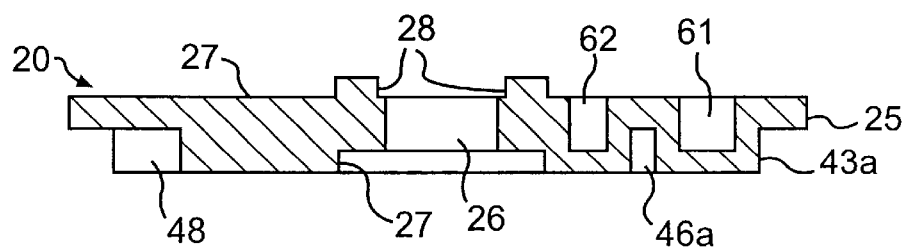
FIG. 7 is a sectional view taken along line 7-7 of the plate shown in FIG. 6.

In a preferred embodiment of the invention, the plates 20 and optional plates 80 are formed of a synthetic resin material using injection molding. With respect to plates 20, projections 43a, 43b are formed by a mold core leaving a hollow 61 from the bottom side 23 of the plate. Similarly, a mold core produces a hollow 62 below top face 22 of the plate body 21 as shown in FIGS. 5–7. By using injection molding techniques, substantially identical plates can be manufactured at a low cost. This enables the economic production of the cutting head 14 from a plurality of the plates. On the other hand, back up plate 39 is preferably a metal plate that is slightly cup shaped to have axial resiliency when compressed by tightening cap screw 17. This ensures positive engagement of the stack with the shaft/bearing and prevents loosening of the cap screw during rotation of the trimmer head.

Although the trimmer head of the invention has been disclosed as being composed of a stack of substantially similar plates 20, a trimmer head having the line retaining devices 41, 42 can be assembled using only one plate 20 with a back-up plate 39 and (optionally) a ground engaging member 16. This modified trimmer head assembly could then be secured to the shaft/bearing using cap screw 17, as described. In this way, a trimmer head is provided in which the cutting line can be secured without the need for tools, the disassembly of the head or the clamping of the cutting line in place. On the other hand, the thus modified trimmer head lacks cutting height adjustment in the manner described.

While preferred embodiments have been set forth with specific details, further embodiments, modifications and variations are contemplated according to the broader aspects of the present invention, all as determined by the spirit and scope of the following claims.

I claim:

1. A mower/trimmer apparatus having a cutting head driven in rotation about an axis, comprising:
   a plurality of cutting line retaining devices spaced axially apart in cutting height adjustment increments along said axis, wherein predetermined cutting heights are obtained by respectively securing a length of cutting line to a respective one of said axially spaced apart line retaining devices.

2. A mower/trimmer apparatus according to claim 1, wherein further including at least two of said line retaining devices disposed at each of said increments.

3. A mower/trimmer apparatus according to claim 2, further including a ground engaging member at one axial end of said cutting head, wherein said cutting head is mounted to be driven in rotation about the other end of said cutting head; and wherein said line retaining devices enable a length of cutting line to be secured to said one line retaining device without using tools and without disassembly of said cutting head.

4. A cutting head for a mower/trimmer apparatus driven in rotation about an axis of rotation, comprising:
   a plurality of plates fastened together in a stack, at least two of said plates having line retaining devices spaced axially apart, further including each of said plates having line retaining devices, including:
   a body having top and bottom surfaces and a peripheral rim;
   said line retaining device having first and second adjacent projections and respective first and second single channels around said first and second projections having opposite ends, said single channels merging into a common channel between said first and second projections wherein at ends of said single channels opposite said common channel, said single channels receive respective ends of a length of cutting line that passes through said first and second single channels around said first and second projections and into said common channel to extend radially outward beyond said peripheral rim; and
   wherein said peripheral rim has a bottom surface that receives a mid portion of a length of cutting line between said first and second projections.

5. A cutting head for a mower/trimmer apparatus according to claim 4, wherein said plate has indentations in said peripheral rim formed adjacent said opposite ends of said first and second single channels, respectively which receive axially extending sections of a length of cutting line.

6. A cutting head for a mower/trimmer apparatus according to claim 4, further including a ground engaging member fastened to one end of said cutting head and the other end being mounted to said trimmer/mower apparatus for being driven in rotation.

7. A cutting head for a mower/trimmer apparatus driven in rotation about an axis of rotation, comprising:

a plurality of plates fastened together in a stack, at least two of said plates having line retaining devices spaced axially apart, including each of said plates having a body with top and bottom surfaces and a mounting hole passing through a center portion of each said plate, and further including a rectangular recess formed in said body adjacent said mounting hole on said top of said body and a downwardly projecting pair of flanges adjacent said hole formed to project beyond the bottom surface of said bottom side of said body, wherein an upper said plate is stackable on a lower said plate with said downwardly projecting pair of flanges of said upper plate being received in said rectangular recess of said lower plate.

8. A cutting head for a mower/trimmer apparatus driven in rotation about an axis of rotation, comprising:

a plurality of plates fastened together in a stack, at least two of said plates having line retaining devices spaced axially apart, wherein each of said plates has a predetermined thickness and a dimensional increment of cutting height adjustment is defined between each of said plates having said line retaining devices.

9. A cutting head for a mower/trimmer apparatus driven in rotation about an axis of rotation, comprising:

a plurality of plates fastened together in a stack, at least two of said plates having line retaining devices spaced axially apart, wherein said line retaining devices are of two different dimensions, respectively for different diameter cutting lines.

10. A cutting head plate for a cutting head of a mower/trimmer apparatus, comprising:

a body having top and bottom surfaces and a peripheral rim;

at least one line retaining device formed along a periphery of said plate;

said line retaining device having first and second adjacent projections and respective first and second single channels around said first and second projections having opposite ends, said single channels merging into a common channel between said first and second projections wherein and at ends of said single channels opposite said common channel, said single channels receive respective ends of a length of cutting line that passes through said first and second single channels around said first and second projections and into said common channel to extend radially outward beyond said peripheral rim; and wherein said peripheral rim has a bottom surface that receives a mid portion of a length of cutting line between said first and second projections.

11. A cutting head plate according to claim 10, wherein said cutting head plate has indentations in said peripheral rim formed adjacent said opposite ends of said first and second single channels, respectively which receive axially extending sections of a length of cutting line.

12. A cutting head plate according to claim 10, further including a mounting hole passing through a center portion of said plate and having a rectangular recess formed in said body adjacent said mounting hole on said top of said body and a downwardly projecting pair of flanges adjacent said hole formed to project beyond the bottom surface of said bottom side of said body, wherein an upper said plate is stackable on a lower said plate with said downwardly projecting pair of flanges of said upper plate being received in said rectangular recess of said lower plate.

13. A cutting head plate according to claim 10, wherein a thickness of said plate defines a dimensional increment of cutting height adjustment.

14. A cutting head plate according to claim 10, wherein said line retaining devices are of two different dimensions, respectively for different diameter cutting lines.

15. A cutting head for a mower/trimmer apparatus driven in rotation about an axis of rotation, comprising:

at least one plate having at least one line retaining device;

said plate having including:

a body having top and bottom surfaces and a peripheral rim;

said at least one line retaining device having first and second adjacent projections and respective first and second single channels around said first and second projections having opposite ends, said single channels merging into a common channel between said first and second projections wherein at ends of said single channels opposite said common channel, said single channels receive respective ends of a length of cutting line that passes through said first and second single channels around said first and second projections and into said common channel to extend radially outward beyond said peripheral rim; and wherein said peripheral rim has a bottom surface that receives a mid portion of a length of cutting line between said first and second projections.

16. A cutting head for a mower/trimmer apparatus according to claim 15, further including a plurality of said plates and a fastener fastened together in a stack.

* * * * *